United States Patent [19]

Sasso

[11] 4,191,069

[45] Mar. 4, 1980

[54] MULTI-SPEED GEAR TRANSMISSION ESPECIALLY FOR USE IN WARPING MACHINES

[76] Inventor: Luigi Sasso, Frazione Orazzo, Strona Biellese (Vercelli), Italy

[21] Appl. No.: 903,335

[22] Filed: May 5, 1978

[30] Foreign Application Priority Data

May 19, 1977 [IT] Italy ................ 68147 A/77

[51] Int. Cl.² ............................................. F16H 37/06
[52] U.S. Cl. .......................................... 74/681; 74/674
[58] Field of Search ......................... 74/674, 681, 705

[56] References Cited

U.S. PATENT DOCUMENTS

| | | | |
|---|---|---|---|
| 2,600,562 | 6/1952 | Meyer | 74/681 |
| 2,697,365 | 12/1954 | Williams | 74/681 |
| 2,833,160 | 5/1958 | Morgan | 74/681 |
| 3,082,646 | 3/1963 | Friedmann et al. | 74/674 X |
| 3,128,662 | 4/1964 | Obenshain | 74/674 X |
| 3,654,822 | 4/1972 | Singer et al. | 74/681 |

*Primary Examiner*—Lance Chandler
*Attorney, Agent, or Firm*—Sughrue, Rothwell, Mion, Zinn and Macpeak

[57] ABSTRACT

To obtain a large number, in excess of 1000, of different speeds for a thread carriage driven by the warp cylinder of a sectional warping machine a multi-speed gear transmission is provided which has two gear mechanisms, each with several gear ratios, interposed between drive input and output shafts of the transmission, the two gear mechanisms being mechanically connected in parallel with the drive input shaft and driving respective crown wheels of a differential gear the planet carrier or spider of which is in turn mechanically coupled to the transmission output shaft.

3 Claims, 4 Drawing Figures

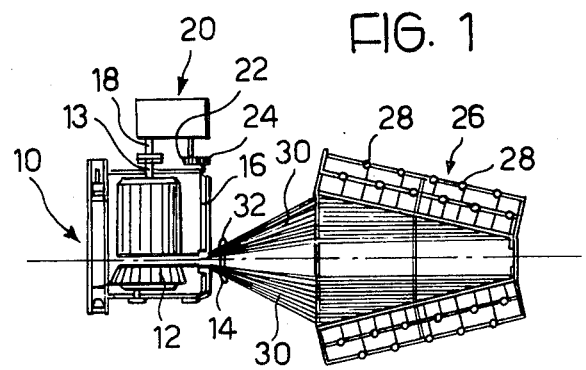
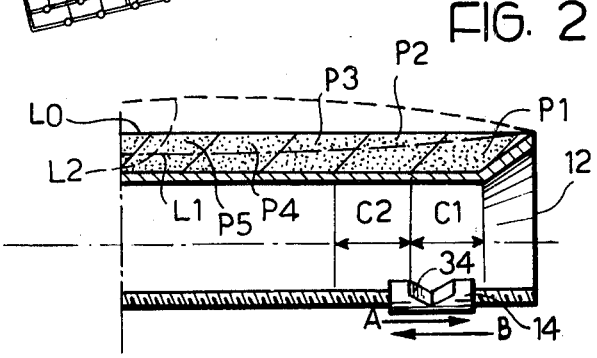
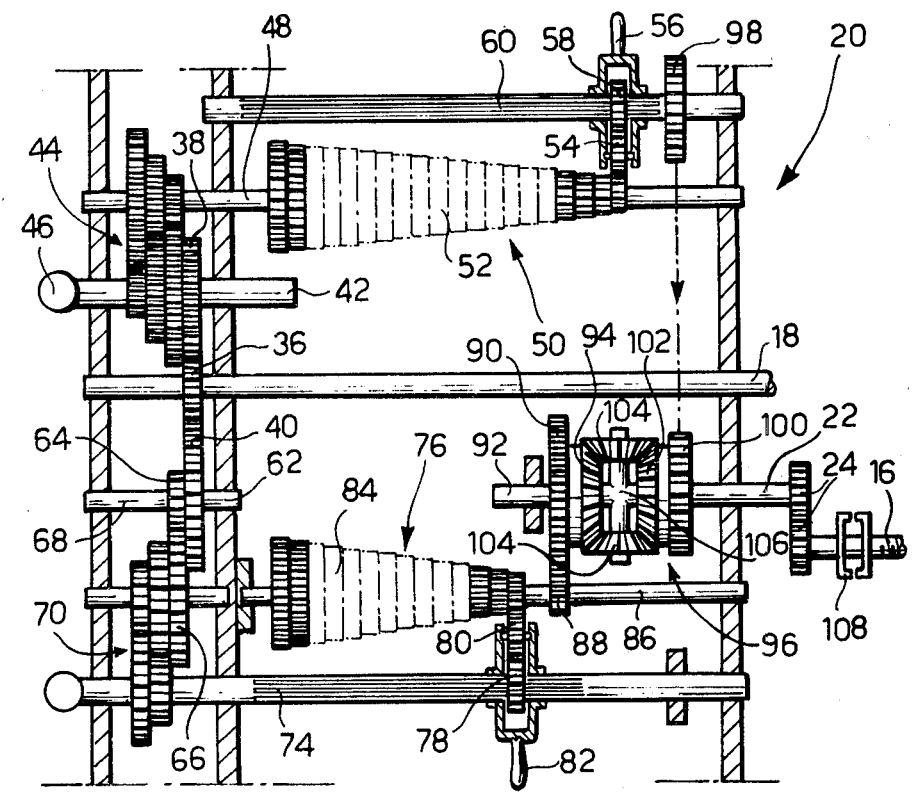

MULTI-SPEED GEAR TRANSMISSION ESPECIALLY FOR USE IN WARPING MACHINES

The present invention relates to multi-speed gear transmissions especially for transmitting the drive from the warp cylinder of a sectional warping machine to the mechanism for moving a thread carriage of the said machine, of the kind having a gear change mechanism with several speeds interposed between drive input and output shafts of the transmission.

Sectional warping machines are used for winding onto a warp cylinder a very large quantity of warp threads destined to form the warp of a fabric. The warp threads are unwound from respective bobbins carried upon a bobbin frame or creel. The warp threads pass firstly through a cross reed and then through a reducing reed. The reducing reed is carried by a thread carriage which is advanced by displacements equal to a fraction of the axial length of the warp cylinder so as to wind successively onto the latter sections or "loads", each of which is made up of a thread coming from each bobbin. When the winding of one section or load is complete, the carriage is moved in the reverse direction until it reaches the position corresponding to the start of the winding of the next section or load. This operation should ideally result in a perfectly cylindrical winding on the warp cylinder, since with such a winding each section or load is made up of an equal length of warp thread. It is possible to satisfy this requirement, however, only by choosing a precisely predetermined ratio between the speed of rotation of the warp cylinder and the speed of travel of the thread carriage. The carriage is made to travel by rotation of a threaded shaft or leadscrew which in turn is driven by an output shaft of a multi-speed gear transmission having a drive input shaft which is coupled to the warp cylinder.

The criterion for selecting the pitch of the thread carriage movement, that is, the amount of axial displacement of the carriage for each revolution of the warp cylinder is given by the following formula:

$$pc = nf/as \times k/t$$

where
  pc = pitch of the thread carriage movement
  nf = number of warp threads of the creel
  k = constant derived from experiment
  t = yarn count.

From the above formula it will be seen that the pitch pc of the carriage movement is inversely proportional to the yarn count.

Multi-speed gear transmissions are already known which consist of a gearing interposed between input and output drive shafts. Such gearing is normally a mixed gearing comprising, in series, between a drive input and a drive output shaft, a gear change mechanism with two or three speeds and a Norton gear having a cone of gear wheels. The gear wheels of the cone may be of the order of ten in number, thus allowing a hundred or more different drive speeds of "gear changes" to be obtained.

With the very large number of types of modern yarns, this number of speeds is insufficient to allow the desired pitch of the thread carriage for every kind of yarn. In fact, as well as the yarn count t, which may vary within a very wide range, the pitch pc of the thread carriage movement also varies according to the friction between the threads and the braking mechanisms interposed between the creel and the warp cylinder. These variations, taken account of in the constant k, are dependent on other different factors, including the type of thread, and atmospheric humidity.

As a result of the aforesaid wide variations it would be desirable to have available a mechanical gear transmission having more than a thousand gear speeds, that is, very much more than the number of speeds afforded by transmissions now in use and known.

The available space does not permit the use of a Norton gear with a cone of gear wheels of such length as to satisfy this requirement. On the other hand, the use of an infinitely-variable-ratio drive transmission such as a mechanical, hydraulic or electric speed variator is excluded, since such variators do not ensure a fixed ratio between the speed of a drive input shaft and the speed of a drive output shaft, which it is necessary to have in the case of a warping machine.

The object of the present invention is to provide a gear transmission with several speed ratios of the kind previously referred to which can offer an extremely high number (e.g. more than 1000) of speed ratios or "gear changes" and which is also of simple and compact construction.

According to the present invention, there is provided a multi-speed gear transmission, especially for transmitting drive from the warp cylinder of a sectional warping machine to mechanism for moving a thread carriage of the said warping machine, of the kind comprising a first gear mechanism with several gear ratios interposed between drive input and output shafts of a drive transmission, characterised in that the transmission comprises a second gear mechanism with several speed ratios mechanically connected to the drive input shaft and arranged in parallel with the said first gear mechanism, and in that the outputs of the two gear mechanisms are each mechanically coupled to a respective crown wheel of a differential gear having a planet carrier or spider which is in turn mechanically coupled to the output shaft of the gear transmission.

One of the advantages of the transmission of the invention is that it is possible to arrange the two gear mechanisms side by side in the same casing, with reduced overall length. The differential gear combines the drive outputs of the two gear mechanisms, making it possible to produce a number of speed ratios or "gear changes" equal to the product of the numbers of ratios of the single gear mechanisms.

Preferably, each gear mechanism is of the mixed kind consisting of a Norton gear and a gear change mechanism arranged mechanically in series with each other. The use of two Norton gears makes it possible to produce for each gear mechanism a fairly high ratio with reduced overall dimensions, and constitutes a very simple solution from the constructional standpoint.

The invention will be further described, by way of non-limiting example, with reference to the accompanying drawings, in which:

FIG. 1 is a diagrammatic plan view of a sectional warping machine fitted with a mutli-speed gear transmission according to the invention;

FIG. 2 is a diagrammatic longitudinal section, on an enlarged scale, of part of a warp cylinder during thread winding by means of the warping machine shown in FIG. 1;

FIG. 4 is a diagrammatic longitudinal sectional view of the said gear transmission.

Figure 3:
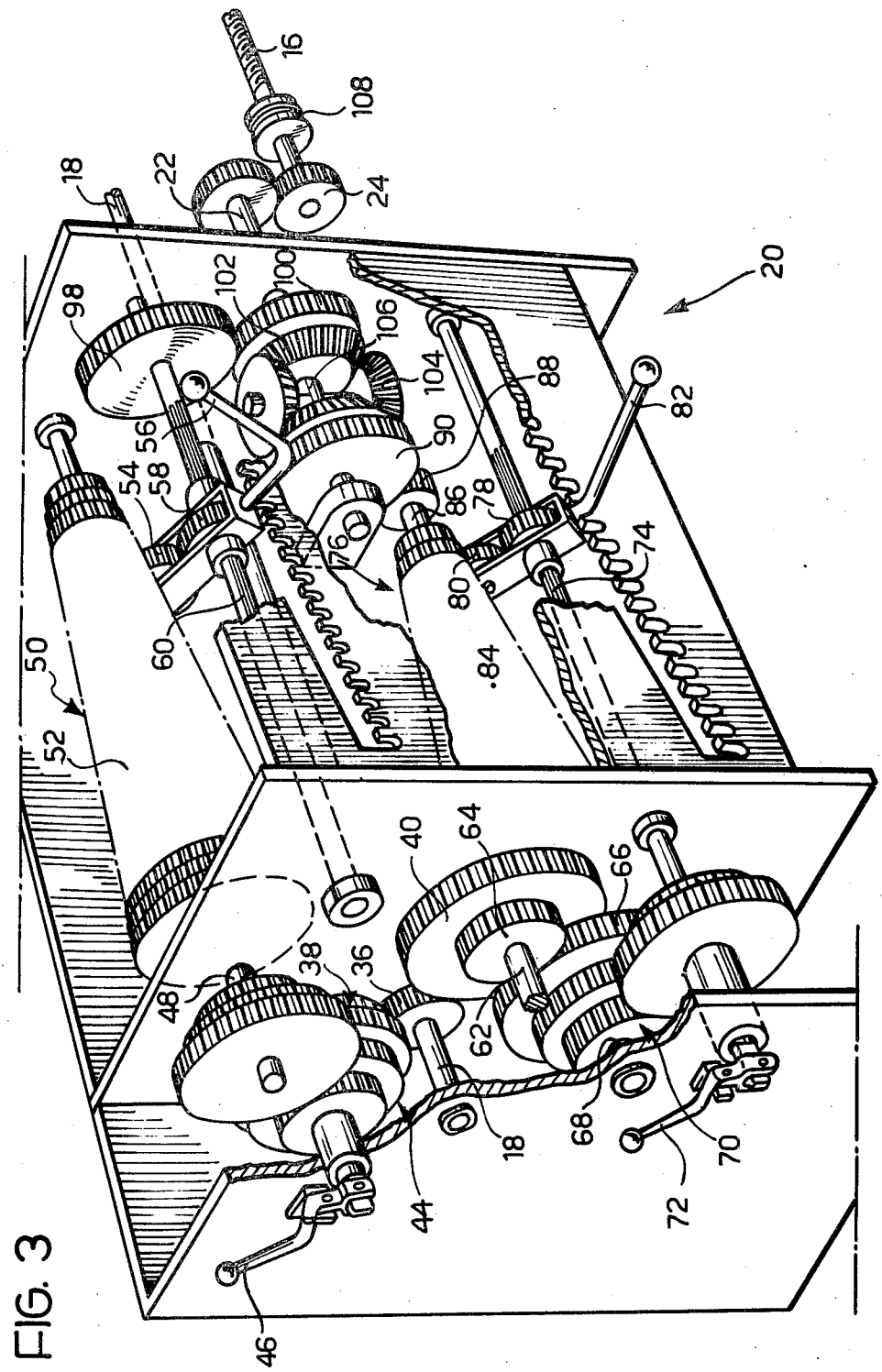
FIG. 3 is a diagrammatic perspective view, partly cut away, of a gear transmission according to a preferred embodiment of the invention.

In FIG. 1 a sectional warping machine is indicated generally by reference numeral 10 and comprises, inter alia, a warp cylinder 12 keyed to a shaft 13 which is driven by rotary drive means (not shown). The warping machine 10 further includes a thread carriage 14 which is movable along a rotary screw-threaded shaft or leadscrew 16 extending parallel to the axis of the shaft 13. The shaft 13 is connected directly, or through gearing or other coupling means, to the drive input shaft 18 of a multi-speed gear transmission 20 according to the present invention. The transmission 20 has a drive output shaft 22 which is connected through a pair of gear wheels 24 or like coupling means to the threaded shaft or leadscrew 16 to rotate the latter.

In FIG. 1 there is also shown a creel or bobbin frame 26 which holds a number of bobbins 38 from which individual warp threads 30 are fed to the warp cylinder 12, via a cross reed 32 and a reducer reed 34 carried by the thread carriage 14.

FIG. 2 is a longitudinal sectional view on an enlarged scale of part of the warp cylinder 12 showing how the warp threads 30 are wound onto the cylinder 12. At the commencement of the winding the reducer reed 34 carried by the carriage 14 is in the position shown, and it is caused to move firstly in the direction of the arrow A through a predetermined stroke $C_1$, so as to form upon the cylinder 12 a first section or load $P_1$ of wound thread. Next, the carriage 14 is moved in the opposite direction, in the direction of the arrow B, by an amount $C_1+C_2$, before commencing the winding of a second section or load $P_2$ during a further movement of the carriage 14 in the direction of the arrow A through a stroke $C_2$ equal to $C_1$. Winding then proceeds in a similar manner to form the successive sections or loads $P_3$, $P_4$, $P_5$. . . .

By the aforesaid sequence of operations a winding is formed on the warp cylinder 12 which is as far as possible cylindrical, the profile of the winding being indicated by an unbroken line $L_0$. The speed of forward travel of the carriage 14 in the direction of the arrow A during each stroke $C_1$, $C_2$, . . . , has to be predetermined with the greatest possible precision. If the speed of the carriage 14 is too great, this leads to a progressive reduction in the diameters of successive loads $P_1$, $P_2$, . . . , as indicated by the broken line $L_1$, whereas if the speed of the carriage 14 is too low a progressive increase is produced in the diameters of successive loads, as indicated by the broken line $L_2$. If a winding is effected with increasing or decreasing diameters of successive loads then the resulting fabric produced from the warp threads will be "crooked", with one selvedge shorter than the other.

As will be understood, in order to produce a cylindrical winding with a profile as near $L_0$ as possible for every type and count of yarn and for every other condition which might affect the winding tension of the warp threads it is necessary that the drive transmission 20 shall have a very high number of different speeds, with minimum 'jumps' between one speed and the next successive speed. FIGS. 3 and 4 illustrate a drive transmission 20 according to a preferred form of embodiment of the invention which allows these requirements to be met.

The drive transmission 20 has a metal casing which supports various rotary elements, including the drive input shaft 18 and the drive output shaft 22. A gear wheel 36 is keyed onto the shaft 18 and meshes with two gear wheels 38 and 40.

The gear wheel 38 is keyed onto a drive input shaft 42 of a gear change mechanism 44 of the Maander type with three speed ratios selectable by means of a manual lever 46. The gear change mechanism 44 has a drive output shaft 48 which in turn constitutes the drive input shaft of a first Norton gear 50 having a conical array of gear wheels 52 comprising, in the illustrated example, twenty gear wheels. A planet wheel 54 is selectively engageable with the gear wheels 52 and meshes with a sun wheel 58 keyed for axial sliding movement upon a splined shaft 60 which constitutes the drive output shaft of the Norton gear 50.

The gear wheel 40 is keyed onto a layshaft 62 onto which there is also keyed a gear wheel 64 which transmits drive via a gear wheel 66 to the drive input shaft 68 of a second gear change mechanism 70 of the "Maander" type, having two speed ratios. These speeds can be selected by means of a manual lever 72 similar to the lever 46. The drive output shaft 74 of the second gear change mechanism 70 is a splined shaft which constitutes the drive input shaft of a second Norton gear 76. A gear wheel 78 is keyed onto the shaft 74 and is slidable axially thereon. The gear wheel 78 meshes with a planet wheel 80. A manual control lever 82, similar to the lever 56, enables the planet wheel 80 to be engaged selectively with the various gear wheels of a second conical array of gear wheels 84 forming the second Norton gear 76. In the example illustrated the second conical array comprises fourteen gear wheels 84. The second Norton gear 76 has a drive output shaft 86 onto which the gear wheels 84 are keyed.

A gear wheel 88 is keyed onto the driven shaft 86 of the second Norton gear 76, the gear wheel 88 meshing with a gear wheel 90 keyed onto a stub shaft 92 on which there is also keyed one of the crown wheels 94 of a differential gear 96.

A gear wheel 98 is keyed onto the driven shaft 60 of the first Norton gear 50, the gear wheel 98 meshing with a gear wheel 100 which is freely rotatable upon the drive output shaft 22 of the transmission 20 and is secured to the other crown wheel 102 of the differential gear 96 for rotation therewith. The two crown wheels 94 and 102 are interconnected by planet wheels 104 of the differential gear 96, carried by a planet carrier or spider 106 which is secured to the drive output shaft 22 for rotation therewith. The shaft 22 is coupled to the threaded shaft or leadscrew 16 through a pair of meshing gear wheels 24 and a clutch 108.

A gear transmission as herein described, with reference to FIGS. 3 and 4 provides, in a very limited space and with a simple structure, a total of 1680 speed ratios or "gear changes", equal to the product of the numbers of available gear ratios of the four gear mechanisms 44, 50, 70, 76. This very high number of gear speeds makes it possible to achieve the even winding of the warp cylinder which is the object of the invention.

It will be understood that a gear transmission according to the invention is also capable of being applied in different fields besides warping machines, and particularly to other types of winding machine.

I claim:

1. Multi-speed gear transmission of the type comprising a drive input shaft for connection to a warp cylinder of a sectional warping machine, having a displaceable thread carriage, a drive output shaft for connection to displacement means for effecting movement of the thread carriage, and a first gear mechanism having several gear ratios interposed between said drive input and drive output shafts, wherein the improvement comprises:

a second gear mechanism with several gear ratios mechanically coupled to the drive input shaft in parallel with said first gear mechanism, a diffenential gear having two crown wheels, a planet carrier and planet wheels carried by said planet carrier and meshing with said planet crown wheels, means coupling the first and second gear mechanisms to said crown wheels of the differential gear, and means coupling the other said crown wheel of the differential gear to the said output shaft.

2. Gear transmission as defined in claim 1, wherein each gear mechanism is of the mixed kind and comprises a Norton gear and a gear change mechanism mechanically in series with each other.

3. Gear transmission as defined in claim 1, wherein the two Norton gears are mounted upon respective parallel shafts which are parallel to the drive input and output shafts.

* * * * *